United States Patent [19]

Harada et al.

[11] Patent Number: 4,669,939

[45] Date of Patent: Jun. 2, 1987

[54] WORKPIECE CHARGER FOR HEATING FURNACE

[75] Inventors: Saburo Harada, Ikoma; Takao Yoshino, Osaka; Rikio Takeshima, Chiba; Masakazu Sengan, Chiba; Kyoichi Kissei, Chiba, all of Japan

[73] Assignees: Chugai Ro Co., Ltd., Osaka; Kawasaki Steel Corporation, Hyogo, both of Japan

[21] Appl. No.: 761,807

[22] Filed: Aug. 2, 1985

[30] Foreign Application Priority Data

Aug. 3, 1984 [JP] Japan ............................ 59-164072

[51] Int. Cl.[4] ............................................ B65G 25/04

[52] U.S. Cl. .................................. 414/173; 198/614; 414/198; 432/122

[58] Field of Search ............... 414/172, 173, 180, 196, 414/198; 198/774, 614, 468.6, 456; 432/122

[56] References Cited

U.S. PATENT DOCUMENTS

| | | | |
|---|---|---|---|
| 1,127,315 | 2/1915 | Swindell | 414/198 |
| 1,883,763 | 10/1932 | Cochran | 198/774 |
| 3,375,941 | 4/1968 | Repper, Jr. | 198/468.6 X |
| 3,471,134 | 10/1969 | Cone | 263/6 |
| 3,666,086 | 5/1972 | Brockmann | 198/774 |
| 4,585,411 | 4/1986 | Bocci et al. | 198/614 X |
| 4,586,898 | 5/1986 | Orbeck | 432/122 |

FOREIGN PATENT DOCUMENTS

| | | | |
|---|---|---|---|
| 1941103 | 2/1970 | Fed. Rep. of Germany | 198/774 |

*Primary Examiner*—Robert J. Spar
*Assistant Examiner*—Stuart J. Millman
*Attorney, Agent, or Firm*—Wenderoth, Lind & Ponack

[57] ABSTRACT

A workpiece charging unit for a walking beam furnace has an entry table and a charging conveyor positioned exteriorly and interiorly of the entry end opening of the furnace. The charging conveyor can undergo a movement along a generally rectangular path for the receipt of the workpiece from the entry table and for the subsequent transfer of the workpiece onto the fixed beams or rails within the heating chamber where it can be picked up by the walking beam conveyor unit for the passage through the heating chamber. The charging conveyor includes charging beams, a plurality of support posts for the support of the charging beams and frame structure coupled with the horizontal and vertical drive mechanisms.

3 Claims, 8 Drawing Figures

WORKPIECE CHARGER FOR HEATING FURNACE

BACKGROUND OF THE INVENTION

The present invention generally relates to a reheating furnace having a walking beam type conveyor for transferring workpieces through the furnace in a series of steps and, more particularly, to a workpiece charging unit disposed at the entrance to the furnace for charging the workpieces successively from the entry table onto the walking beam type conveyor within the reheating furnace.

A reheating furnace having a walking beam type conveyor extending through the substantially entire length of and within the reheating chamber for the successive transport of workpieces such as, for example, steel slabs, steel blooms, or steel billets, is not a recent development and is disclosed in, for example, U.S. Pat. No. 3,471,134 patented Oct. 7, 1969. When it comes to the workpiece charging unit, many conventional reheating furnaces of this type employ a pusher or ram as exemplified by the above mentioned U.S. patent.

So far as the charging of the workpieces into the heating chamber is concerned, the above mentioned U.S. patent merely illustrates that the workpieces are serially pushed by an entry ram means onto an entry table where they are picked up by the movable conveyor assembly (forming a part of the walking beam type conveyor) and walked laterally through the heating chamber in spaced relationship until they reach the extractor end of the heating chamber. The use of the ram at the entrance to the heating chamber is not the heart of the invention of the above mentioned U.S. patent, but rather the invention is in the walking beam type conveyor in which improvement has been made to practically obviate or reduce surface blemishes and chilled spots which might be formed in the heated workpieces in contact with the workpiece supports such as water-cooled fixed rails within the heating chamber.

The use of the walking beam type conveyor in the reheating furnace according to the above mentioned U.S. patent may be satisfactory in that the possible formation of the surface blemishes caused by contact with the workpiece supports during the passage of the workpieces from the entry end opening to the extractor end opening of the reheating furnace can be minimized.

However, the reheating furnace disclosed in the above mentioned U.S. patent as well as the other conventional types have still a problem in that similar surface blemishes tend to be formed in the workpieces being successively or one by one charged into the heating chamber because of the use of the pusher or ram adjacent the entrance to the heating chamber. Moreover, they have additional problems in that the drive for the pusher or ram requires a relatively great power to be consumed with the increased space also required for installation laterally of the entry table and in that, since the entry rails installed in the vicinity of the entry end opening of the heating furnace partially protrude into the heating chamber, a sliding door for selective opening and closure of the entry end opening cannot be completely closed and, therefore, the system is susceptible to a loss of furnace atmosphere including a loss of heat from the heating chamber.

SUMMARY OF THE INVENTION

The present invention has been developed with a view to substantially eliminating the above described problems inherent in the prior art reheating furnace of the type having the walking beam type conveyor and has for its essential object to provide an improved reheating furnace wherein no pusher or ram is employed and, therefore, the entry end opening can be completely closed, when no workpiece is charged into the heating chamber, with the loss of furnace atmosphere consequently being minimized or substantially eliminated.

In order to accomplish this object, the present invention provides the reheating furnace with a unique workpiece charging unit disposed in the vicinity of the entry end opening of the reheating furnace and comprising an entry table and a charging conveyor of the walking beam type positioned exteriorly and interiorly of the heating chamber, respectively, the charging conveyor being alternately driven by horizontal and vertical drive mechanisms so as to move in a generally rectangular path in a vertical plane for the receipt of the workpiece from the entry table and for the subsequent transfer of the workpiece onto the fixed beams within the heating chamber where it can be picked up by the walking beam conveyor unit for the passage through the heating chamber. The charging conveyor includes charging beams and a plurality of support posts for the support of the charging beams and drivingly coupled with the horizontal and vertical drive mechanisms. The support posts extend from below into the heating chamber and are positioned within the heating chamber regardless of the position of the charging beams which may partially protrude outwards from the entry end opening in readiness for the receipt of the workpiece from the entry table.

According to the present invention, since the pattern of movement of the charging conveyor is such that the movable beams which partially protrude outwards from the entry end opening for the receipt of the workpiece can be upwardly lifted and then horizontally moved to completely retract inwards from the entry end opening, the sliding door can completely close the entry end opening immediately after the charging of the workpiece into the heating chamber. Therefore, the loss of furnace atmosphere, particularly heat, can advantageously be minimized. Moreover, the use of the charging conveyor of the type referred to hereinabove obviates the use of any form of pusher and its related drive arrangements which have hitherto been arranged laterally of the entry table, so that the space so saved can be advantageously utilized for installation of, for example, a heat recuperator for preheating air.

BRIEF DESCRIPTION OF THE DRAWINGS

This and other objects and features of the present invention will become clear from the following description taken in conjunction with a preferred embodiment thereof with reference to the accompanying drawings, in which.

DETAILED DESCRIPTION OF THE EMBODIMENT

Figure 1:
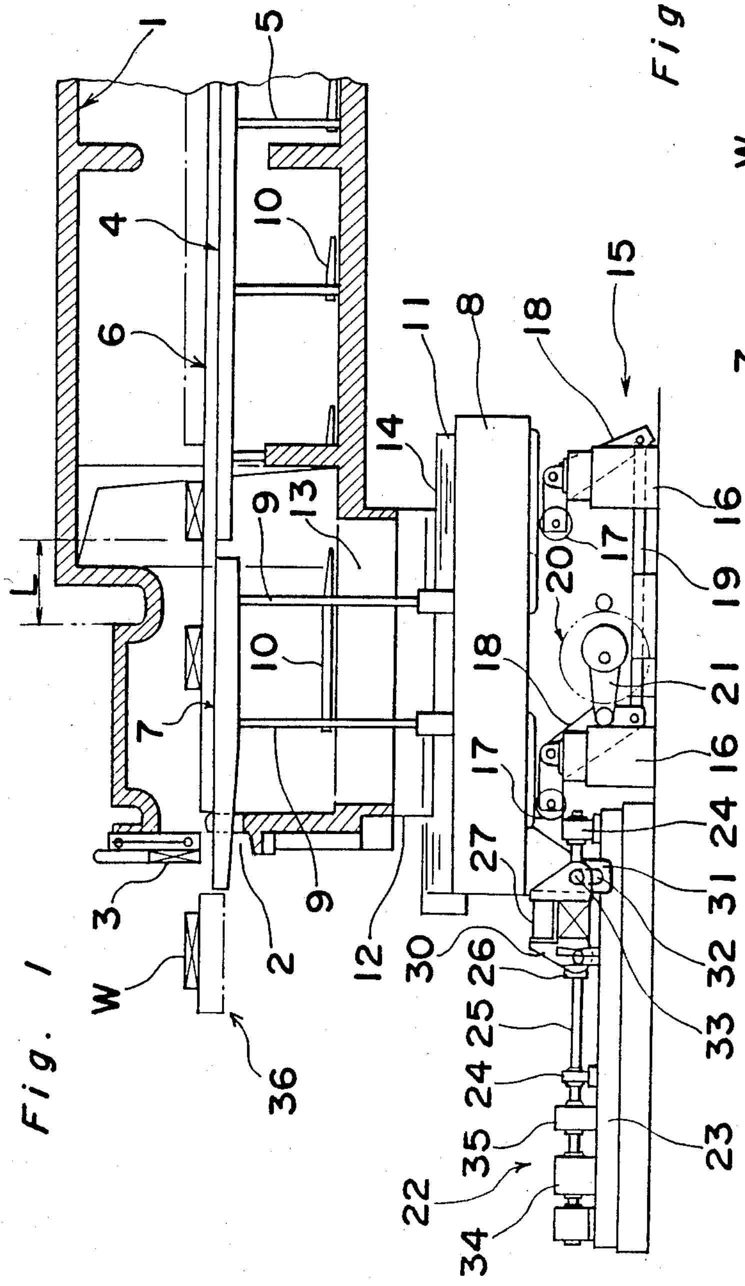
FIG. 1 is a fragmentary side sectional view of a walking beam furnace embodying the present invention.
Figure 2:
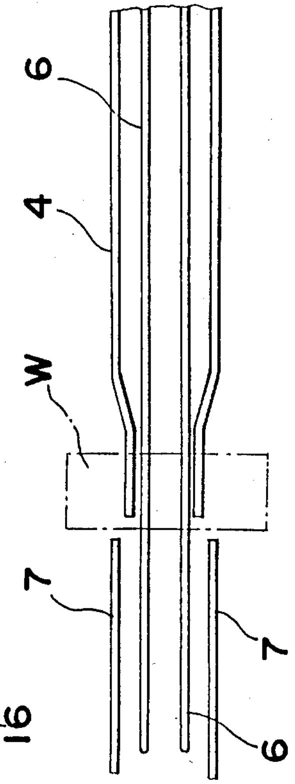
FIG. 2 is a top plan view showing an arrangement of movable and stationary rails adjacent and in the vicinity of the entry end opening of the furnace of FIG. 1.

Referring now to FIGS. 1 and 2, a walking beam furnace for the heat-treatment of workpieces, only one of which is designated by W, comprises a generally tunnel-shaped refractory structure 1 having its opposite ends defining entry and extractor end openings, only the entry end opening being shown at 2 and adapted to be selectively closed and opened by a sliding door 3. The furnace also comprises a charging conveyor, operatively disposed interiorly of the refractory structure 1 and in the vicinity of the entry end opening 2, and a walking beam type conveyor of known construction disposed within the interior of the refractory structure 1 and on one side of the charging conveyor opposite to the entry end opening 2.

The charging conveyor is in the form of a walking beam type and comprises a plurality of, for example, a pair of, parallel charging beams or rails 7 rigidly mounted on a frame structure 8 for movement together therewith through a plurality of support posts 9 which loosely extend through a bottom opening 13 defined in the floor adjacent the entry end opening 2. The frame structure 8 has a liquid seal trough 11 mounted thereon and containing water 14 used to seal the bottom opening 13 in cooperation with an imperforate skirt 12 depending from the periphery of the bottom opening 13 and constantly immersed in the water 14 regardless of the position of the frame structure 8 in a vertical plane.

Figure 3A:
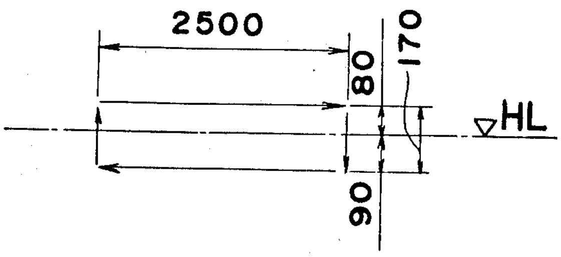
FIGS. 3(*a*) and 3(*b*) are diagrams showing the pattern of movement of delivery and transport conveyor units, respectively.
Figure 3B:
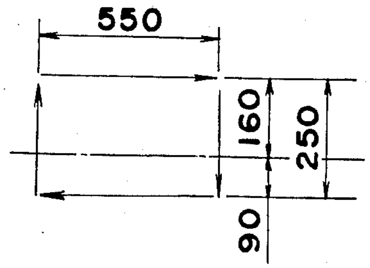

The charging beams or rails 7 so far described can be reciprocated or orbited in a substantially rectangular path with the horizontal and vertical strokes measuring, for example, 2500 mm and 170 mm, respectively, as shown in FIG. 3(*a*) This can be accomplished by means of a vertical drive mechanism 15 and a horizontal drive mechanism 22 as will be described in detail later.

The walking beam type conveyor comprises a fixed conveyor unit including a plurality of, for example, a pair of, parallel fixed beams or rails 6 extending from a position inwardly adjacent the entry end opening 2 to a position inwardly adjacent the extractor end opening of the refractory structure 1, which fixed beams 6 are supported within the interior of the refractory structure 1 in any known manner such as, for example, by means of a plurality of support posts. The walking beam type conveyor also comprises a movable conveyor unit including a plurality of, for example, a pair of, parallel movable beams or rails 4 supported on a frame structure (not shown) by means of support posts 5 so as to extend from adjacent the charging beams 7 to a position inwardly adjacent the extractor end opening of the refractory structure 1.

As shown in FIG. 3(*b*), the movable beams or rails 4 can also be reciprocated or orbited in a substantially rectangular path with respect to the vertical plane with the horizontal and vertical strokes measuring, for example, 550 mm and 250 mm, respectively, by means of vertical and horizontal drive mechanisms (both not shown) known to those skilled in the art or similar to the respective drive mechanisms 15 and 22.

The support posts 5 and 9 for the movable beams or rails 4 and the charging beams or rails 7 are equipped with heat shielding plates 10.

Figure 5A:
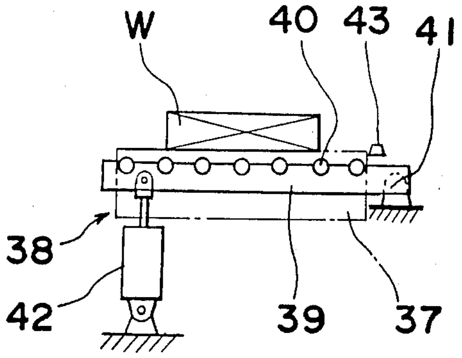
FIGS. 5(*a*) to 5(*c*) are schematic diagrams showing the sequence of operation of an entry table.
Figure 5B:
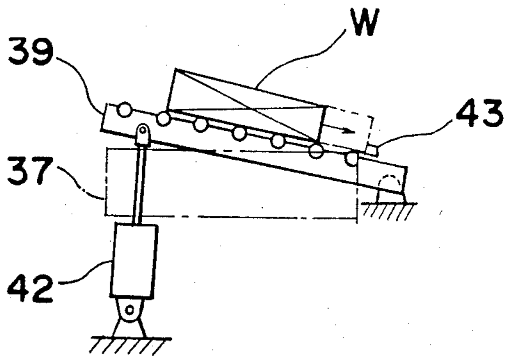
Figure 5C:
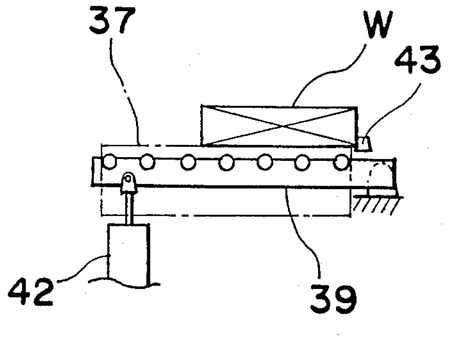

Adjacent the entry end opening 2 of the refractory structure 1, there is disposed an entry table 36 positioned exteriorly of the refractory structure 1. As shown in FIGS. 5(*a*) to 5(*c*), the entry table 36 comprises a roller table 37 comprised of a plurality of rolls and a workpiece positioning roller table 38. The workpiece positioning roller table 38 is constituted by a plurality of arms 39 having a plurality of freely rotatably supported rollers 40, positioned between the rolls of the roller table 37, and supported for tilting motion about a fixed pin 41, the tilting of the arms 39 between tilted and horizontal positions being effected by a hydraulic cylinder 42 having a reciprocateable piston rod connected thereto. Reference numeral 43 designates a workpiece stopper arranged at a location where the workpiece sliding down along the roller table 38 when the arms 39 are held in the tilted position as shown in FIG. 5(*b*) is desired to be retained in readiness for the transfer thereof onto the charging conveyor unit as will be described later.

Referring to FIG. 1, the vertical drive mechanism 15 comprises a plurality of arms 18 each pivotally mounted on a respective support block 16 and at one end having a freely rotatable roller 17 contacting the undersurface of the frame structure 8, while the other ends of the respective arms 18 are linked together by means of connecting links 19 which extend in parallel to each other so that all of the arms 18 can be pivoted simultaneously in the same direction. The vertical drive mechanism 15 also comprises a motor-driven eccentric wheel 20 and a cranking arm 21 having one end rotatably connected to the eccentric wheel 20 at a location offset from the axis of rotation of the eccentric wheel 20 and the other end pivotally connected with one of the arms 19 so that each complete rotation of the eccentric wheel 20 can result in push and pull of the arm 19 and, hence, all of the arms 19. Thus, it will readily be seen that each complete rotation of the wheel 20 raises and lowers the frame structure 8 and, hence, the charging conveyor unit.

Figure 4:
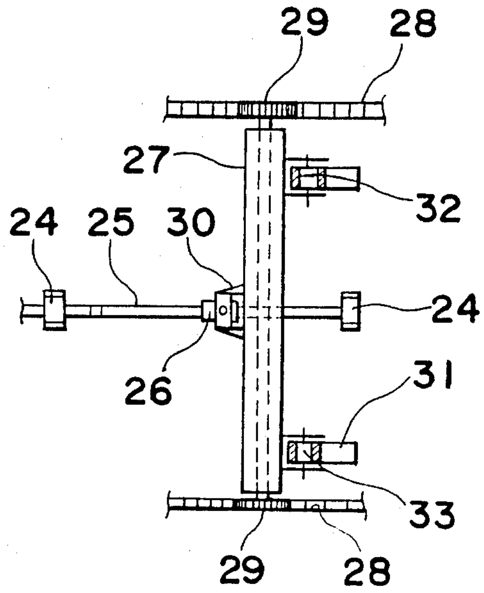
FIG. 4 is a top plan view of a horizontal drive mechanism.

The horizontal drive mechanism 22 comprises, as shown in FIGS. 1 and 4, a stationary bench 23 having a pair of spaced racks 28 rigidly mounted thereon so as to extend in a direction parallel to the longitudinal sense of the refractory structure 1, and a motor 34 rigidly mounted on the bench 23 intermediately between the racks 28 and having its drive shaft coaxially connected through a reduction gear box 35 with a screw 25 that is rotatably supported by a plurality of spaced bearings 24 rigid on the bench 23 and extends to a position beneath the frame structure 8. A cross-bar 27 having at its opposite ends respective pinions 29 is arranged between the racks 28 and above the screw 25 with the pinions 29 mounted on and engaged with the rack 28. The cross-bar 27 is in turn operatively coupled with the screw 25 through a nut 26 secured to an intermediate portion of the cross-bar 27 through a fixture 30. Preferably, the screw 25 and the nut 26 altogether constitute a rotary-to-linear motion translator known as a ball-bearing screw assembly.

The cross-bar 27 is operatively coupled with the frame structure 8 in such a manner that the movement of the cross-bar 27 in a direction towards and away from the motor 34 can be accompanied with a corresponding movement of the frame structure 8 without interfering with the vertical shift and lift of the frame structure 8. For this purpose, one end of the frame structure 8 is provided with a pair of spaced slotted brackets 31 having vertical slots 32 defined therein, into which slots 32 are slightly loosely engaged respective guide rollers 33 carried by the cross-bar 27.

The walking beam furnace constructed as hereinbefore described according to the present invention is operated in the following manner.

When the workpiece W is transported onto the entry table 36 as shown in FIG. 5(*a*), the hydraulic cylinder 42 is actuated to extend its piston rod to allow the arms 39 to emerge from between the rolls of the roller table 37, and tilt upwardly as shown in FIG. 5(*b*). In this way, the workpiece W is transferred from the roller table 37 onto the rollers 40, subsequently sliding downwardly by gravity until it abuts against the stopper 43.

Thereafter, the cylinder 42 is actuated to retract the piston rod to return the arms 39 back to a horizontal position as shown in FIG. 5(*c*) permitting the workpiece W to rest again on the roller table 37 while held in abutment with the stopper 43.

The door 3 is then elevated to open the entry end opening 2. At this time, the charging beams 7 are held at a lowered right-hand position. However, simultaneously with or immediately after the movement of the door 3 to open the entry end opening 2, the motor 34 is driven to rotate the screw 25 in the direction required to move the frame structure 8 in a direction towards the motor 34 with respective end portions of the charging beams 7 adjacent the entry end opening 2 consequently emerging outwards from the refractory structure 1 through the entry end opening 2. At the time the charging beams 7 have arrived at a lowered left-hand portion as a result of the movement of the frame structure 8 in the direction close towards the motor 34, those end portions of the charging beams 7 are brought to a position immediately beneath respective spaces each between the neighboring rolls of the roller table 37 in readiness for the lift of the workpiece W resting on the roller table 37.

The vertical drive mechanism 15 is subsequently operated to raise the frame structure 8 together with the charging beams 7 which then lift the workpiece W a certain height, for example, 80 mm, relative to the hearth line HL shown in FIG. 3(*a*). In this way, the workpiece W is picked up by the charging beams 7 and, thereafter, the motor 34 is reversed to rotate the screw 25 in the opposite direction required to move the frame structure 8 in a direction away from the motor 34 so that the workpiece W now resting on the charging beams 7 can be completely drawn into the interior of the retractory structure 1 through the entry end opening 2, followed by the lowering of the door 3 to close the entry end opening 2. When the workpiece W picked up by the charging beams 7 has been completely drawn into the interior of the refractory structure 1, the charging beams 7 are then held at a raised right-hand position. The charging beams 7 in the raised right-hand position are thereafter lowered by the operation of the vertical drive mechanism 15 to again assume the initial, lowered right-hand position.

The workpiece W is now placed on the fixed beams 6 which extend between the charging beams 7. By repeating the movement of the charging beams 7 several times along the generally rectangular path with respect to the vertical plane in the manner as hereinbefore described, the workpiece W can be transported onto a predetermined position above respective portions of the fixed beams 6 where the movable beams 4 are situated. It is to be noted that the last horizontal stroke of the charging beams 7 is adjusted in the light of the interval L, shown in FIG. 1, between the predetermined position above the respective portions of the fixed beams 6, where the movable beams 4 are situated, and the position of the workpiece which is subsequently transported.

The workpiece W transferred onto the movable conveyor assembly is in turn transported towards the extractor end opening of the refractory structure by the cyclic movement of the movable beams 4 along the generally rectangular path in a manner similar to the movement of the charging beams 7.

In the foregoing description, the vertical stroke of the charging beams 7 has been described and shown as being shorter than that of the movable beams 4, but they may be of the same value. However, the use of the shorter stroke of the charging beams 7 than that of the movable beams 4 is advantageous in that, even though the workpiece occupies the predetermined position within the interior of the refractory structure 1, the next subsequent workpiece resting on the entry table can be charged into the interior of the refractory structure 1 notwithstanding the presence of the preceding workpiece if the movable beams 4 are held in the raised position and, therefore, the zone of the interior of the refractory structure 1 where the charging beams 7 occupy can be utilized as a storage zone without the charging of any workpiece into the refractory structure being obstructed by the movement of the movable beams 4.

Moreover, where the entry table 36 is provided with the positioning roller table 38, the workpiece can be retained always at a predetermined position on the entry table 36 regardless of the size of the workpiece and, therefore, not only can the horizontal stroke of the charging beams 7 be managed easily, but also the workpiece can be charged into the refractory structure with its position having corrected to assume a horizontal position.

Although the present invention has been described in connection with the preferred embodiment thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. In a walking beam furnace which has a generally tunnel-shaped refractory structure having a hearth opening and having at its opposite ends entry and extractor end openings to be selectively closed and opened by doors, respectively, and a walking beam type conveyor operatively disposed within the refractory structure so as to extend lengthwise of the refractory structure, said walking beam type conveyor having a fixed beam means and a movable beam means capable of undergoing a movement along a generally rectangular path, a workpiece charging unit which comprises:

a plurality of charging beams operatively disposed within the refractory structure adjacent to the entry end opening;

a frame structure having a plurality of support posts extending upright therefrom into the interior of the refractory structure through said hearth opening, said charging beams being rigidly mounted atop said support posts;

an entry table disposed exteriorly of and adjacent to the entry end opening for the temporary support of at least one workpiece to be charged into the interior of the refractory structure for heat-treatment, said entry table having a roller table, a positioning roller table having a plurality of rollers disposed on an upper surface thereof and also having a stopper arranged adjacent the refractory structure, and a lifting device disposed adjacent one side of the positioning roller table remote from the refractory structure; and horizontal and vertical drive mechanisms coupled with the frame structure for causing the charging beams to undergo a movement along a generally rectangular path, independently of the movement of the movable beam means, for receiving the workpiece from the entry table through the entry end opening and charging it onto the walking beam type conveyor.

2. The furnace as claimed in claim 1, wherein the position to which the charging beams are upwardly shifted is located below the position to which the movable beam means are upwardly shifted.

3. In a walking beam furnace which has a generally tunnel-shaped refractory structure having a hearth opening and having at its opposite end entry and extractor end openings to be selectively closed and opened by doors, respectively, and a walking beam type conveyor operatively disposed within the refractory structure so as to extend lengthwise of the refractory structure, said walking beam type conveyor having a fixed beam means and a movable beam means capable of undergoing a movement along a generally rectangular path including being shifted upwardly to a upwardly shifted position, a workpiece charging unit which comprises:

a plurality of charging beams operatively disposed within the refractory structure adjacent to the entry end opening;

a frame structure having a plurality of support posts extending upright therefrom into the interior of the refractory structure through said hearth opening, said charging beams being rigidly mounted atop said support posts;

an entry table disposed exteriorly of and adjacent to the entry end opening for the temporary support of at least one workpiece to be charged into the interior of the refractory structure for heat-treatment; and horizontal and vertical drive mechanisms coupled with the frame structure for causing the charging beams to undergo a movement along a generally rectangular path, independently of the movement of the movable beam means, including being shifted upwardly to an upwardly shifted position, for receiving the workpiece from the entry table through the entry end opening and charging it onto the walking beam type conveyor, the upwardly shifted position of said charging beams being located below the upwardly shifted position of said movable beam means, and the stroke of horizontal movement of said charging beams being greater than the stroke of horizontal movement of said movable beam means.

* * * * *